(12) United States Patent
Boehme et al.

(10) Patent No.: US 11,710,488 B2
(45) Date of Patent: *Jul. 25, 2023

(54) TRANSCRIPTION OF COMMUNICATIONS USING MULTIPLE SPEECH RECOGNITION SYSTEMS

(71) Applicant: Sorenson IP Holdings, LLC, Salt Lake City, UT (US)

(72) Inventors: Kenneth Boehme, South Jordan, UT (US); Michael Holm, Bountiful, UT (US); Shane Roylance, Farmington, UT (US)

(73) Assignee: Sorenson IP Holdings, LLC, Salt Lake City, UT (US)

( * ) Notice: Subject to any disclaimer, the term of this patent is extended or adjusted under 35 U.S.C. 154(b) by 191 days.

This patent is subject to a terminal disclaimer.

(21) Appl. No.: 16/975,677

(22) PCT Filed: Dec. 19, 2018

(86) PCT No.: PCT/US2018/066572
§ 371 (c)(1),
(2) Date: Aug. 25, 2020

(87) PCT Pub. No.: WO2019/164574
PCT Pub. Date: Aug. 29, 2019

(65) Prior Publication Data
US 2020/0411007 A1    Dec. 31, 2020

Related U.S. Application Data

(63) Continuation of application No. 15/905,180, filed on Feb. 26, 2018, now Pat. No. 10,192,554.

(51) Int. Cl.
*G10L 15/26* (2006.01)
*G10L 15/22* (2006.01)
*G10L 15/32* (2013.01)

(52) U.S. Cl.
CPC .............. *G10L 15/26* (2013.01); *G10L 15/32* (2013.01)

(58) Field of Classification Search
CPC ................................. G10L 15/22; G10L 15/26
See application file for complete search history.

(56) References Cited

U.S. PATENT DOCUMENTS 6,122,613 A    9/2000  Baker
6,487,530 B1   11/2002  Lin et al.
(Continued)

FOREIGN PATENT DOCUMENTS

JP    2011002656 A    1/2011
JP    2015018238 A    1/2015

OTHER PUBLICATIONS

Peter Hays, Ceo, VTCSecure, LLC, Nov. 7, 2017, Notice of Ex Parte in CG Docket Nos. 03-123 and 10-51, 2 pgs.
(Continued)

*Primary Examiner* — Jialong He
(74) *Attorney, Agent, or Firm* — Maschoff Brennan (57) ABSTRACT

A method may include obtaining audio data originating at a first device during a communication session between the first device and a second device and providing the audio data to a first speech recognition system to generate a first transcript based on the audio data and directing the first transcript to the second device. The method may also include in response to obtaining a quality indication regarding a quality of the first transcript, multiplexing the audio data to provide the audio data to a second speech recognition system to generate a second transcript based on the audio data while continuing to provide the audio data to the first speech recognition system and direct the first transcript to the second device, and in response to obtaining a transfer indication that occurs after multiplexing of the audio data,
(Continued)

directing the second transcript to the second device instead of the first transcript.

18 Claims, 6 Drawing Sheets

(56) References Cited

U.S. PATENT DOCUMENTS

| | | | |
|---|---|---|---|
| 6,567,503 | B2 | 5/2003 | Engelke et al. |
| 7,174,299 | B2 | 2/2007 | Fujii et al. |
| 7,228,275 | B1 | 6/2007 | Endo et al. |
| 7,236,932 | B1 | 6/2007 | Grajski |
| 7,660,715 | B1 | 2/2010 | Thambiratnam |
| 7,899,669 | B2 | 3/2011 | Gadbois |
| 8,898,065 | B2 | 11/2014 | Newman et al. |
| 9,076,450 | B1 | 7/2015 | Sadek et al. |
| 9,374,536 | B1 | 6/2016 | Nola et al. |
| 9,497,315 | B1 | 11/2016 | Pakidko et al. |
| 9,514,747 | B1 | 12/2016 | Bisani et al. |
| 9,628,620 | B1 | 4/2017 | Rae et al. |
| 9,773,501 | B1 | 9/2017 | Brooksby et al. |
| 2005/0094777 | A1 | 5/2005 | McClelland |
| 2005/0119897 | A1 | 6/2005 | Bennett et al. |
| 2007/0126926 | A1 | 6/2007 | Miyamoto et al. |
| 2008/0040111 | A1 | 2/2008 | Miyamoto et al. |
| 2008/0243515 | A1* | 10/2008 | Odinak .................. G10L 13/08 704/E15.047 |
| 2009/0187410 | A1 | 7/2009 | Wilpon et al. |
| 2010/0004930 | A1 | 1/2010 | Strope et al. |
| 2010/0057450 | A1* | 3/2010 | Koll ....................... G10L 15/32 704/270.1 |
| 2010/0063815 | A1 | 3/2010 | Cloran et al. |
| 2010/0121637 | A1 | 5/2010 | Roy et al. |
| 2010/0318355 | A1 | 12/2010 | Li et al. |
| 2010/0323728 | A1 | 12/2010 | Gould et al. |
| 2011/0123003 | A1 | 5/2011 | Romriell et al. |
| 2012/0197770 | A1 | 8/2012 | Raheja et al. |
| 2012/0245934 | A1 | 9/2012 | Talwar et al. |
| 2012/0265529 | A1 | 10/2012 | Nachtrab et al. |
| 2013/0035937 | A1 | 2/2013 | Webb et al. |
| 2013/0060572 | A1 | 3/2013 | Garland et al. |
| 2013/0132084 | A1 | 5/2013 | Stonehocker et al. |
| 2013/0151250 | A1 | 6/2013 | VanBlon |
| 2014/0067390 | A1 | 3/2014 | Webb |
| 2015/0058006 | A1 | 2/2015 | Proux |
| 2015/0094105 | A1 | 4/2015 | Pan |
| 2015/0095026 | A1 | 4/2015 | Bisani et al. |
| 2015/0120289 | A1 | 4/2015 | Lev-Tov et al. |
| 2015/0287408 | A1 | 10/2015 | Svendsen et al. |
| 2015/0341486 | A1 | 11/2015 | Knighton |
| 2017/0201613 | A1 | 7/2017 | Engelke et al. |
| 2017/0206808 | A1 | 7/2017 | Engelke et al. |
| 2017/0206888 | A1 | 7/2017 | Engelke et al. |
| 2017/0206914 | A1 | 7/2017 | Engelke et al. |
| 2017/0208172 | A1 | 7/2017 | Engelke et al. |
| 2018/0034961 | A1 | 2/2018 | Engelke et al. |
| 2018/0173494 | A1* | 6/2018 | Choi ..................... G06N 20/00 |
| 2020/0404097 | A1 | 12/2020 | Engelke et al. |
| 2020/0412869 | A1 | 12/2020 | Engelke et al. |

OTHER PUBLICATIONS

Lambert Mathias, Statistical Machine Translation and Automatic Speech Recognition under Uncertainty, Dissertation submitted to Johns Hopkins University, Dec. 2007, 131 pages.

Mike Wald, Captioning for Deaf and Hard of Hearing People by Editing Automatic Speech Recognition in Real Time, ICCHP'06 Proceedings of the 10th International Conference on Computers Helping People with Special Needs, Jul. 2006, pp. 683-690, Linz, Austria.

Jeff Adams, Kenneth Basye, Alok Parlikar, Andrew Fletcher, & Jangwon Kim, Automated Speech Recognition for Captioned Telephone Conversations, Faculty Works, Nov. 3, 2017, pp. 1-12.

Lasecki et al., Real-Time Captioning by Groups of Non-Experts, Rochester Institute of Technology, Oct. 2012, USA.

International Search Report and Written Opinion as issued in connection with International Application No. PCT/US18/66572, dated Apr. 26, 2019.

* cited by examiner

TRANSCRIPTION OF COMMUNICATIONS USING MULTIPLE SPEECH RECOGNITION SYSTEMS

CROSS-REFERENCE TO RELATED APPLICATIONS

This application claims priority to and the benefit of U.S. patent application Ser. No. 15/905,180, filed Feb. 26, 2018, entitled TRANSCRIPTION OF COMMUNICATIONS, which is incorporated herein in its entirety.

FIELD

The embodiments discussed herein are related to transcriptions of communications.

BACKGROUND

Transcriptions of audio communications between people may assist people that are hard-of-hearing or deaf to participate in the audio communications. To provide the transcriptions to a hard-of-hearing or deaf person, a particular device or application running on a mobile device or computer may be used to display text transcriptions of the audio being received by the hard of hearing or deaf person.

The subject matter claimed herein is not limited to embodiments that solve any disadvantages or that operate only in environments such as those described above. Rather, this background is only provided to illustrate one example technology area where some embodiments described herein may be practiced.

SUMMARY

A method to transcribe communications is provided. The method may include obtaining audio data originating at a first device during a communication session between the first device and a second device. The communication session may be configured for verbal communication. The method may further include providing the audio data to a first speech recognition system to generate a first transcript based on the audio data and directing the first transcript to the second device. The method may also include in response to obtaining a quality indication regarding a quality of the first transcript, multiplexing the audio data to provide the audio data to a second speech recognition system to generate a second transcript based on the audio data while continuing to provide the audio data to the first speech recognition system to generate the first transcript and continuing to direct the first transcript to the second device. The method may further include in response to obtaining a transfer indication that occurs after multiplexing of the audio data, directing the second transcript to the second device instead of the first transcript.

BRIEF DESCRIPTION OF THE DRAWINGS

Example embodiments will be described and explained with additional specificity and detail through the use of the accompanying drawings in which.

DETAILED DESCRIPTION OF SOME EXAMPLE EMBODIMENTS

Some embodiments in this disclosure relate to systems and methods that may be configured to transcribe audio of a communication session. For example, in some embodiments, audio of a communication session may be provided to a transcription system to transcribe the audio from a device that receives and/or generates the audio. A transcription of the audio generated by the transcription system may be provided back to the device for display to a user of the device. The transcription may assist the user to better understand what is being said during the communication session.

In some embodiments, a transcription of audio may be generated by different types of transcription systems. For example, a transcription of audio may be generated by a fully machine based automatic speech recognition system. Fully machine based ASR systems may operate without human intervention and may be referred to in this disclosure as automatic systems. Alternatively or additionally, a transcription of audio may be generated by re-voicing transcription systems. Re-voicing transcription systems, referred to in this disclosure as re-voicing systems, may receive and broadcast audio to a captioning agent. The captioning agent may listen to the broadcast and speaks the words from the broadcast. The words spoken by the captioning agent are captured to generate re-voiced audio. The re-voiced audio may be used by a speech recognition program that is trained to the voice of the captioning agent to generate the transcription of the audio.

In some circumstances, different systems may generate transcriptions of different portions of audio of a communication session. For example, at the start of a communication session between first and second devices, an automatic system may generate transcriptions of the audio of the communication session. During the communication session, a re-voicing system may assume responsibility to generate transcriptions of the audio of the communication system in place of the automatic system. In some embodiments, the responsibility to generate the transcriptions of the audio may transfer between system types based on a quality indication with respect to the transcriptions of the audio. Continuing the above example, to transfer between the systems, the audio may be concurrently providing to both the automatic system and the re-voicing system. Thus, for a period of time, both the automatic system and the re-voicing system may be receiving the audio and may be generating transcriptions of the audio. In these and other embodiments, however, only the transcriptions of the automatic system may be provided to the first device for display. In response to a transfer indication, the transcriptions of the re-voicing system may be provided to the first device for display in place of the transcriptions of the automatic system.

The systems and methods to transfer responsibility of generating transcriptions of audio of a communication session between transcription systems described in this disclosure may result in the improved display of transcriptions at a user device. For example, the systems and methods described in this disclosure may reduce duplication of words or word loss when transferring between transcription systems. Thus, this disclosure may improve technology with respect to audio transcriptions and real-time generation and display of audio transcriptions.

Figure 1:
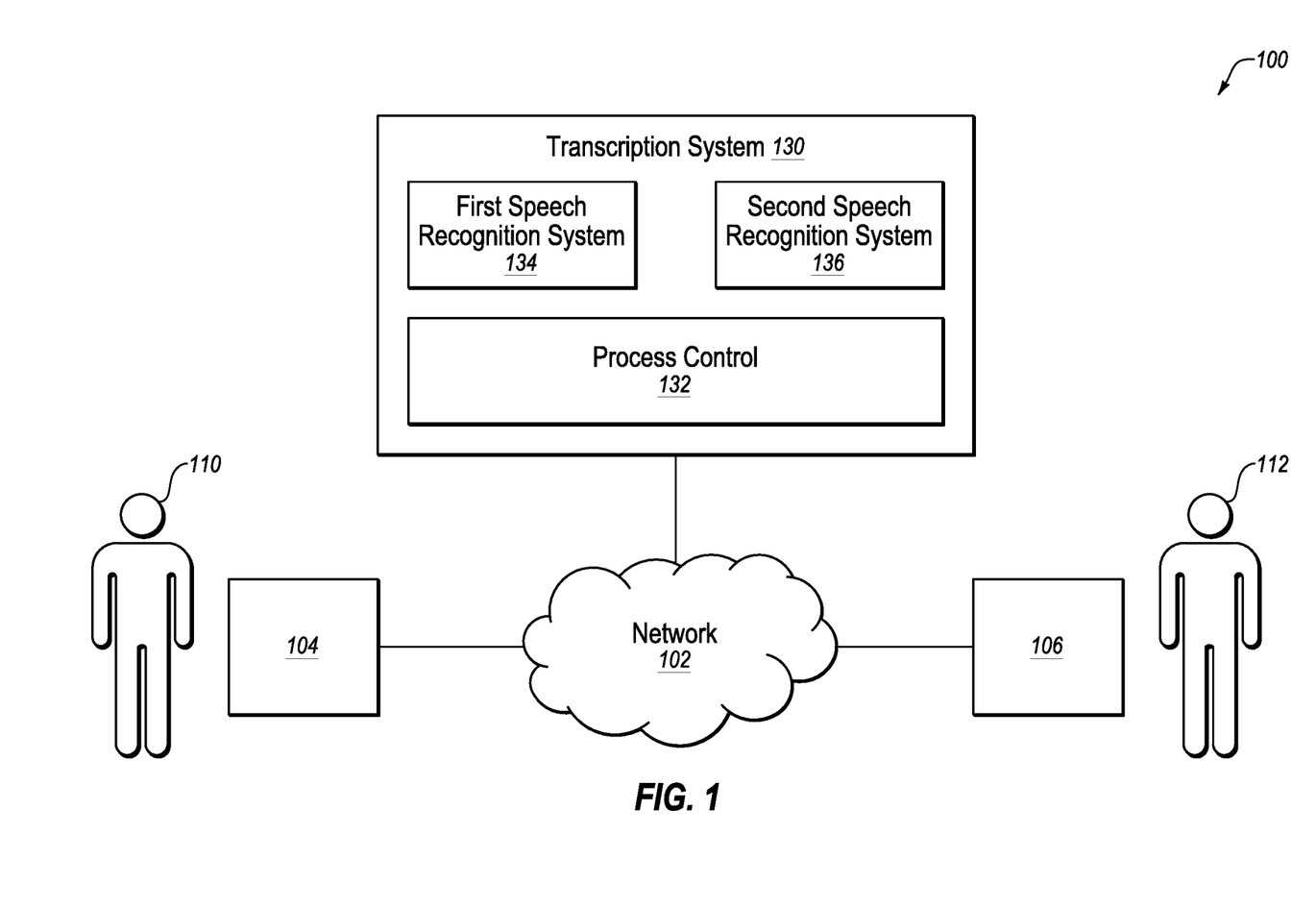
FIG. 1 illustrates an example environment for transcription of communications.

Turning to the figures, FIG. 1 illustrates an example environment 100 for transcription of communications. The environment 100 may be arranged in accordance with at least one embodiment described in the present disclosure. The environment 100 may include a network 102, a first device 104, a second device 106, and a transcription system 130. The transcription system 130 may include a process control 132, a first speech recognition system 134, and a second speech recognition system 136.

The network 102 may be configured to communicatively couple the first device 104, the second device 106, and the transcription system 130. In some embodiments, the network 102 may be any network or configuration of networks configured to send and receive communications between systems and devices. In some embodiments, the network 102 may include a conventional type network, a wired network, an optical network, and/or a wireless network, and may have numerous different configurations. In some embodiments, the network 102 may also be coupled to or may include portions of a telecommunications network, including telephone lines, for sending data in a variety of different communication protocols, such as a plain old telephone system (POTS).

Each of the first and second devices 104 and 106 may be any electronic or digital computing device. For example, each of the first and second devices 104 and 106 may include a desktop computer, a laptop computer, a smartphone, a mobile phone, a tablet computer, a telephone, a phone console, a caption device, a captioning telephone, or any other computing device that may be used for communication between users of the first and second devices 104 and 106.

In some embodiments, each of the first device 104 and the second device 106 may include memory and at least one processor, which are configured to perform operations as described in this disclosure, among other operations. In some embodiments, each of the first device 104 and the second device 106 may include computer-readable instructions that are configured to be executed by each of the first device 104 and the second device 106 to perform operations described in this disclosure.

In some embodiments, each of the first and second devices 104 and 106 may be configured to establish communication sessions with other devices. For example, each of the first and second devices 104 and 106 may be configured to establish an outgoing communication session, such as a telephone call, video call, or other communication session, with another device over a telephone line or network. For example, each of the first device 104 and the second device 106 may communicate over a wireless cellular network, a wired Ethernet network, an optical network, or a POTS line.

In some embodiments, each of the first and second devices 104 and 106 may be configured to obtain audio during a communication session. The audio may be part of a video communication or an audio communication, such as a telephone call. As used in this disclosure, the term audio may be used generically to refer to sounds that may include spoken words. Furthermore, the term "audio" may be used generically to include audio in any format, such as a digital format, an analog format, or a propagating wave format. Furthermore, in the digital format, the audio may be compressed using different types of compression schemes. Also, as used in this disclosure, the term video may be used generically to refer to a compilation of images that may be reproduced in a sequence to produce video.

As an example of obtaining audio, the first device 104 may be configured to obtain first audio from a first user 110. The first audio may include a first voice of the first user 110. The first voice of the first user 110 may be words spoken by the first user. For example, the first device 104 may obtain the first audio from a microphone of the first device 104 or from another device that is communicatively coupled to the first device 104.

The second device 106 may also be configured to obtain second audio from a second user 112. The second audio may include a second voice of the second user 112. The second voice of the second user 111 may be words spoken by the second user. In some embodiments, second device 106 may obtain the second audio from a microphone of the second device 106 or from another device communicatively coupled to the second device 106. During the communication session, the first device 104 may provide the first audio to the second device 106. Alternatively or additionally, the second device 106 may provide the second audio to the first device 104. Thus, during a communication session, both the first device 104 and the second device 106 may obtain both the first audio from the first user 110 and the second audio from the second user 112.

One or both of the first device 104 and the second device 106 may be configured to provide the first audio, the second audio, or both the first audio and the second audio to the transcription system 130. In some embodiments, the transcription system 130 may be configured to generate a transcription of the audio received from either one or both of the first device 104 and the second device 106. The transcription system 130 may also provide the generated transcription of the audio to either one or both of the first device 104 and the second device 106. Either one or both of the first device 104 and the second device 106 may be configured to present the transcription received from the transcription system 130. For example, the first device 104 may be configured to a display the received transcriptions on a display that is part of the first device 104 or that is communicatively coupled to the first device 104.

The transcription system 130 may be configured to generate a transcription of audio using the process control 132 and one or more of the first speech recognition system 134 and the second speech recognition system 136. In some embodiments, each of the process control 132, the first speech recognition system 134, and the second speech recognition system 136 may include any configuration of hardware, such as processors, servers, and database servers that are networked together and configured to perform a task. For example, each of the process control 132, the first speech recognition system 134, and the second speech recognition system 136 may include one or multiple computing systems, such as multiple servers that each include memory and at least one processor.

The first speech recognition system 134 and the second speech recognition system 136 may each be configured to generate transcriptions from audio. In these and other embodiments, both the first speech recognition system 134 and the second speech recognition system 136 may be configured to recognize speech in the audio. Based on the recognized speech, the first speech recognition system 134 and the second speech recognition system 136 may output a transcription of the speech. The transcription may be a written version of the speech in the audio.

In some embodiments, the first speech recognition system 134 and the second speech recognition system 136 may be similar speech recognition system. For example, in some embodiments, the first speech recognition system 134 and the second speech recognition system 136 may both be automatic systems that automatically recognize speech independent of human interaction to generate the transcription. In these and other embodiments, the first speech recognition system 134 and the second speech recognition system 136 may include speech engines that are trained to recognize speech. The speech engine may be trained for general speech and not specifically trained using speech patterns of the participants in the communication session, e.g., the first user 110 or the second user 112. Alternatively or additionally, the speech engine may be specifically trained using speech patterns of one of the participants of the communication session. Alternatively or additionally, both of the first speech recognition system 134 and the second speech recognition system 136 may be re-voicing systems.

In some embodiments, the first speech recognition system 134 and the second speech recognition system 136 may be different speech recognition system. For example, in some embodiments, one of the first speech recognition system 134 and the second speech recognition system 136 may be an automatic system and another may be a re-voicing system.

The process control 132 may be configured to interface with one or both of the first device 104 and the second device 106. For example, the process control 132 may obtain audio from one or both the first device 104 and the second device 106 and provide transcriptions of the audio to one or both of the first device 104 and the second device 106. The process control 132 may also be configured to determine which of the first speech recognition system 134 and the second speech recognition system 136 obtains audio received by the transcription system 130 to generate the transcriptions of the received audio.

In some embodiments, in response to beginning to receive audio for transcription, the process control 132 may select one of the first speech recognition system 134 and the second speech recognition system 136 for providing the audio. The one of the first speech recognition system 134 and the second speech recognition system 136 selected may be referred to with respect to FIG. 1 as the selected speech recognition system.

The process control 132 may select the selected speech recognition system based on a preference from the device providing the audio to the transcription system 130, such as the first device 104 and/or the second device 106. Alternatively or additionally, the process control 132 may select the selected speech recognition system based on information about the audio, such as a language of words in the audio, accents of a speaker speaking in the audio, geographic origin of the audio, among other information.

Alternatively or additionally, the process control 132 may select the selected speech recognition system based on information about the communication session. For example, the information may include network bandwidth for transmitting audio between the first device 104 and the second device 106 and/or the network bandwidth between the transcription system 130 and the device providing the audio to the transcription system 130. The information may further include audio quality of the audio, including compression ratios and compression types applied to the audio. Alternatively or additionally, the information may include data about the first device 104 and the second device 106 participating in the communication session.

After selecting the selected speech recognition system, the process control 132 may provide the audio to the selected speech recognition system. The selected speech recognition system may generate a transcription of the audio and provide the transcription to the process control 132. The process control 132 may provide the transcription to one or both of the first device 104 and the second device 106. The process of transcription generation may continue as audio may be streamed to the transcription system 130 in real-time during a communication session and the transcription of the audio may be generated and streamed back in real-time to one or both of the first device 104 and the second device 106 for presentation. In these and other embodiments, the generation and streaming of the transcription of the audio may be occurring in real-time with a delay. For example, the generation and streaming of the transcription may cause a delay of between one and fifteen seconds between presentation of audio on a device and presentation of a transcription of the audio on the device.

The process control 132 may also be configured to determine to transfer the transcription process between the selected speech recognition system and the other of the speech recognition systems. In some embodiments, the process control 132 may determine to transfer the transcription process in response to a quality indication regarding the quality of the transcription being generated by the selected speech recognition system. For example, the quality indication may be based on information output by the selected speech recognition system. Alternatively or additionally, the quality indication may be based on feedback from one or both of the first device 104 and the second device 106 that is received in response to presentation of the transcription on the first device 104 and/or second device 106. Alternatively or additionally, the quality indication may be based on a quality review from another source.

In some embodiments, the process control 132 may determine to transfer the transcription process in response to one or more other factors. For example, the factors may include a change in the quality of the audio, a change in the bandwidth of the communication session or bandwidth between the transcription system 130 and the device providing the audio to the transcription system 130. Other factors may include a change in audio obtained from the communication session. The change in the audio may include a change of the person speaking from which the audio is derived. For example, during a communication session, the audio initially may be generated from the spoken words of a first person. During the communication session, a second person may participate in the communication session and the audio may be generated from the spoken words of the second person. The change in the person participating in the communication session may cause the process control 132 to transfer the transcription process. Alternatively or additionally, other factors may include a change in the complexity of the words in the audio such as an increase in the average number of syllables over time. Alternatively or additionally, other factors may include a length of the communication. After a particular amount of time has occurred during a communication session may be an indication used to determine to effect a transfer.

To transfer the transcription process, the process control 132 may multiplex the received audio and provide the received audio to the selected speech recognition system and the other speech recognition system. The other speech recognition system may begin generating a transcription of the audio. As a result, the selected speech recognition system and the other speech recognition system may both be generating a transcription of the audio. The transcription generated by the selected speech recognition system may still be provided to one or both of the first device 104 and the second device 106. The transcription generated by the other speech recognition system may not be sent to the first device 104 or the second device 106.

The audio may be multiplexed and provided to both the selected speech recognition system and the other speech recognition system until a transfer indication occurs. In response to a transfer indication, the audio may stop being multiplexed. In these and other embodiments, the audio may be provided to the other speech recognition system and not the selected speech recognition system. Alternatively or additionally, in response to the transfer indication, the transcription from the other speech recognition system may be provided to one or both of the first device 104 and the second device 106. In these and other embodiments, the transcription from the selected speech recognition system may not be provided to the one or both of the first device 104 and the second device 106.

The transfer indication may occur after multiplexing of the audio data. In some embodiments, the transfer indication may occur after multiplexing of the audio and generation of a transcription by the other speech recognition system from the multiplexed audio. Alternatively or additionally, the transfer indication may occur after multiplexing of the audio, generation of a transcription by the other speech recognition system and the selected speech recognition system from the multiplexed audio, and providing of the transcription of the multiplexed audio from the selected speech recognition system to a user device.

In some embodiments, the transfer indication may result from the passage of time from the multiplexing of the audio. Alternatively or additionally, the transfer indication may result from the occurrence of one or more events with respect to one or both of the transcriptions from the other speech recognition system and from the selected speech recognition system. For example, the transfer indication may include the transcription of the other speech recognition system including text.

As another example, the transfer indication may include a last phrase of the transcription of the selected speech recognition system and a last phrase of the transcription of the other speech recognition system being the same. In some embodiments, a phrase may be one or more words. Alternatively or additionally, a phrase may be one or more words, where at least one of the words are longer than four letters. A last phrase of the transcription of the selected speech recognition system and a last phrase of the transcription of the other speech recognition system being the same may indicate that the transcriptions of the selected speech recognition system and the other speech recognition system are aligned. As a result, the transfer to the transcription of the other speech recognition system may occur more smoothly and with less likelihood that the words from the transcription presented to a user are duplicated or missing.

As another example, the transfer indication may include an occurrence of the audio not including spoken words for a time period after multiplexing of the audio. As a result, the transcription of the selected speech recognition system may not include text for the time period. A length of the time period may be selected based on a delay for the other speech recognition system to obtain audio and generate a transcription of the audio. By waiting for the audio to not include spoken words for a length of the time period, the transcriptions of the selected speech recognition system and the other speech recognition system may be aligned. As a result, the transfer to the transcription of the other speech recognition system may occur more smoothly and with less likelihood that the words from the transcription presented to a user are duplicated or missing.

As another example, the transfer indication may include an occurrence of the audio not including spoken words for a time period after multiplexing of the audio and the transcription of the other speech recognition system including text. A length of the time period may be selected based on a delay between reception of audio and presentation of a transcription of the audio to a participant in the communication session. In some embodiments, the time period in this example may be shorter than the time period when the transfer indication includes an occurrence of the audio not including spoken words for a time period after multiplexing of the audio. By waiting for the time period, the transfer to the transcription of the other speech recognition system may occur more smoothly and with less likelihood that the words from the transcription presented to a user are duplicated or missing.

Modifications, additions, or omissions may be made to the environment 100 without departing from the scope of the present disclosure. For example, in some embodiments, the transcription system 130 may include additional functionality. For example, the transcription system 130 may edit the transcriptions or make other alterations to the transcriptions after presentation of the transcriptions one or both of the first device 104 and the second device 106. Alternatively or additionally, in some embodiments, the environment 100 may include additional devices similar to the first and second devices 104 and 106. In these and other embodiments, the similar devices may be configured to present communications as described in this disclosure.

As another example, in some embodiments, the first speech recognition system 134 and the second speech recognition system 136 may share hardware, software, or other components. In these and other embodiments, the first speech recognition system 134 and the second speech recognition system 136 may not be completely separate systems. Rather, reference to the first speech recognition system 134 and the second speech recognition system 136 may refer to a manner in how the transcriptions are generated more than separate systems. For example, in some embodiments, the first speech recognition system 134 and the second speech recognition system 136 may use a common speech recognition engine.

Figure 2A:
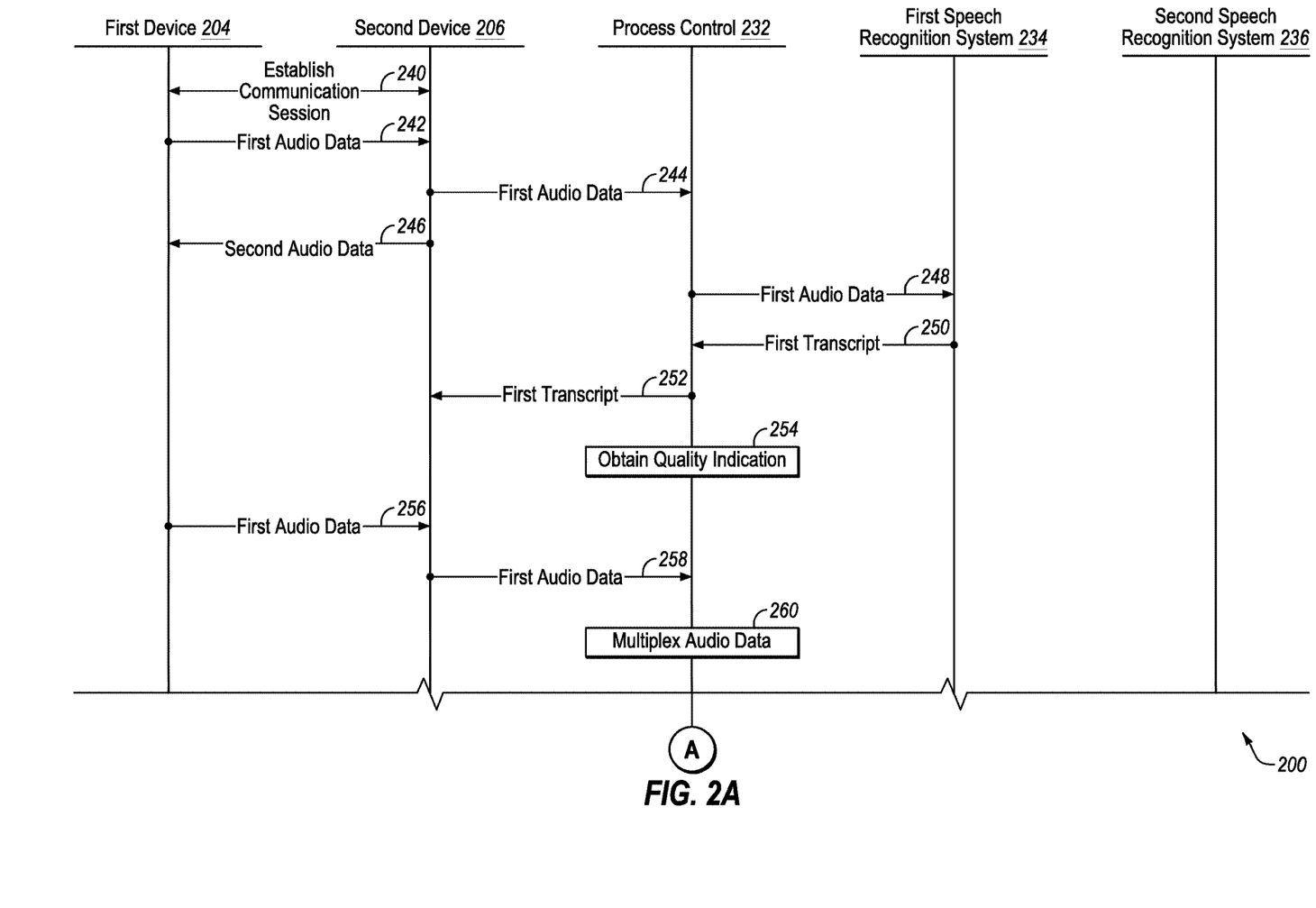
FIGS. 2A and 2B illustrate example operations to transcribe communications.
Figure 2B:
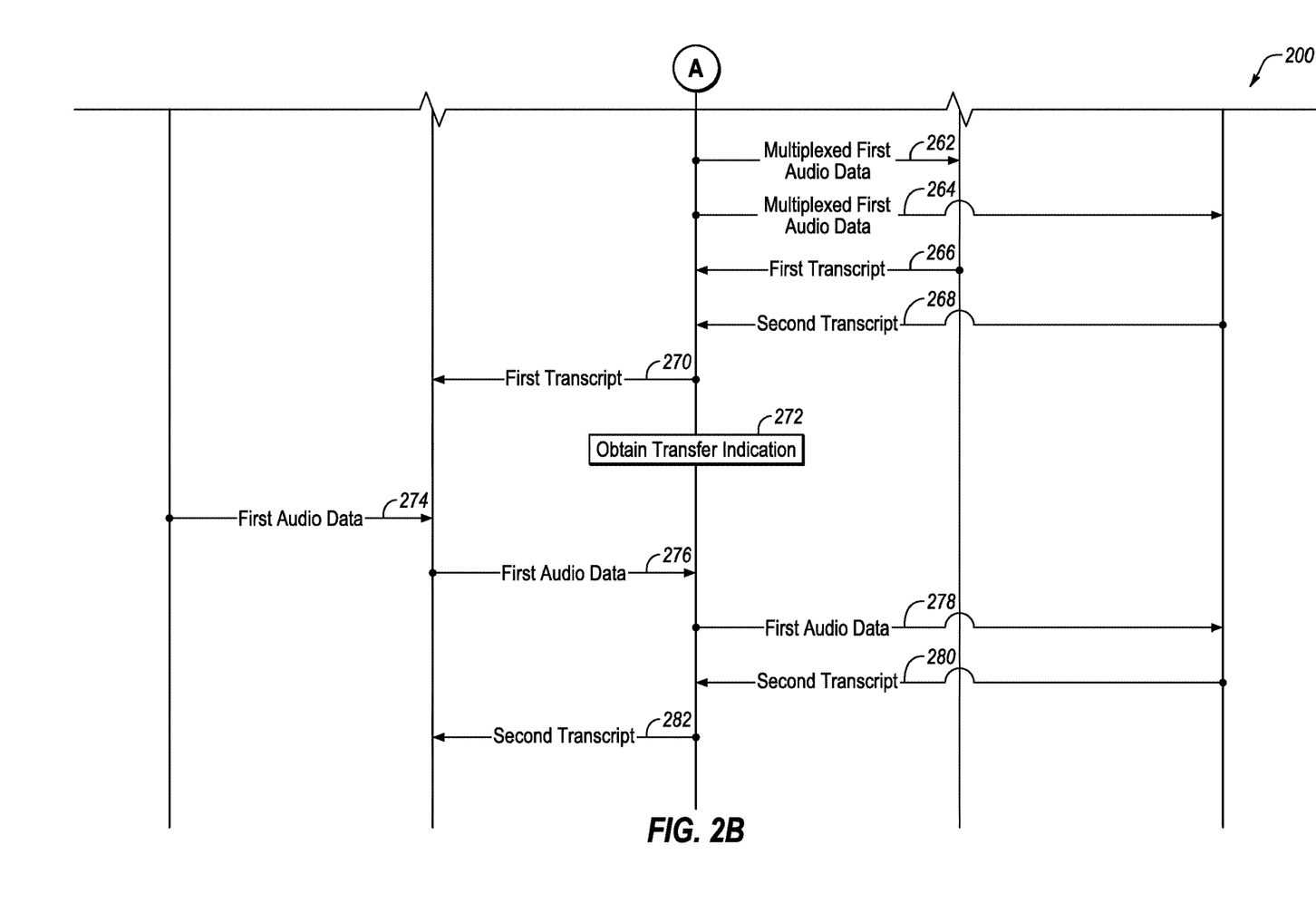

As another example, in some embodiments, the components of the transcription system 130 may be coupled over a network. For example, the first speech recognition system 134 may be coupled with the process control 132 over a network, such as the network 102. FIGS. 2A and 2B illustrate example operations 200 to transcribe communications. The operations 200 may be arranged in accordance with at least one embodiment described in the present disclosure. The operations 200 may be between a first device 204, a second device 206, a process control 232, a first speech recognition system 234, and a second speech recognition system 236. In some embodiments, each of the process control 232, the first speech recognition system 234, and the second speech recognition system 236 may be a combination of hardware devices, such as processors, memory, modems, and other hardware devices that perform the functions described herein. Alternatively or additionally, the first device 204, the second device 206, the process control 232, the first speech recognition system 234, and the second speech recognition system 236 may be analogous to the first device 104, the second device 106, the process control 132, the first speech recognition system 134, and the second speech recognition system 136 of FIG. 1, respectively. Accordingly, no further explanation is provided with respect thereto. Alternatively or additionally, the operations 200 may be an example of the operation of the elements of the environment of FIG. 1.

In some embodiments, the operations 200 may be an example of communications and interactions between the first device 204, the second device 206, the process control 232, first speech recognition system 234, and the second speech recognition system 236. Generally, the operations 200 may relate to transcription of audio of a communication session between the first device 204 and the second device 206. The interactions between the first device 204, the second device 206, the process control 232, the first speech recognition system 234, and the second speech recognition system 236 may occur over one or more networks. The operations 200 illustrated are not exhaustive but are merely representative of operations 200 that may occur. Furthermore, one operation as illustrated may represent one or more communications, operations, and/or data exchanges.

At operation 240, a communication session between the first device 204 and the second device 206 may be established. The communication session may be an audio or video communication session in which audio is exchanged between the first device 204 and the second device 206.

At operation 242, the first device 204 may provide first audio data to the second device 206. The first audio data may be generated by the first device 204 based on speech audio of a first user of the first device 204 captured by the first device 204. The speech may be captured by a microphone. The first audio data may include the speech of the first user. At operation 244, the second device 206 may send the first audio data from the first device 204 to the process control 232. Previous to sending the first audio data to the process control 232, the second device 206 may establish communication with the process control 232. The communication may be established in response to establishing the communication session between the first device 204 and the second device 206 or before the communication session is established. The second device 206 may send the first audio data to the process control 232 through a network that may include one or more other devices. In some embodiments, the second device 206 may not be aware that the first audio data is being routed to the process control 232. Rather, the second device 206 may be performing instructions to merely forward the first audio data to another device that communicates with the process control 232.

At operation 246, the second device 206 may provide second audio data to the first device 204. The second audio data may be generated by the second device 206 based on speech of a second user of the second device 206 captured by the second device 206. The speech may be captured by a microphone. The second audio data may include the speech of the second user.

At operation 248, the process control 232 may provide the first speech recognition system 234 with the first audio data. The process control 232 may provide the first audio data to the first speech recognition system 234 based on the process control 232 selecting the first speech recognition system 234 to generate a transcription of the first audio data. In these and other embodiments, the first speech recognition system 234 may be an automatic system. The process control 232 may select the first speech recognition system 234 based on a preference of the second user of the second device 206. Alternatively or additionally, the process control 232 may select the first speech recognition system 234 based on a type of the communication session occurring between the second device 206 and the first device 204.

At operation 250, the first speech recognition system 234 may generate a first transcript of the first audio data and provide the first transcript to the process control 232. The first speech recognition system 234 may generate the first transcript independent of human intervention in the speech recognition process.

At operation 252, the process control 232 may provide the first transcript to the second device 206. After reception of the first transcript, the second device 206 may present the first transcript to the second user of the second device 206. The first transcript may be presented in substantially real-time with the presentation of the first audio data by the second device 206. Thus, the second user may hear the first audio data and read the first transcript in substantially real-time. Substantially real-time may indicate with a delay between one and fifteen seconds between the presentation of the first audio data and the presentation of the first transcript.

At operation 254, the process control 232 may obtain a quality indication of the quality of the first transcript. In some embodiments, the process control 232 may obtain the quality indication from the second device 206. In these and other embodiments, the second user may interact with the second device 206 to express a sentiment about the quality of the first transcript. The second device 206 may obtain the user input and pass the user input to the process control 232. The user input may include a quality indication of the first transcript. Alternatively or additionally, the process control 232 may obtain the quality indication based on information from the first speech recognition system 234. In these and other embodiments, the first speech recognition system 234 may provide the process control 232 with a confidence score related to the first transcript. The confidence score may indicate a level of confidence of the first speech recognition system 234 with respect to the accuracy of the first transcript. The process control 232 may compare the confidence score and a quality threshold. Based on the comparison, the process control 232 may obtain the quality indication. For example, when the confidence score is higher than the quality threshold, the quality indication may indicate that the quality of the first transcript is acceptable or good. When the confidence score is lower than or equal to the quality threshold, the quality indication may indicate that the quality of the first transcript is unacceptable or bad. The quality threshold may be based on empirical evidence gathered regarding confidence scores relations to perceived quality of transcriptions. For example, when a user indicates that a transcription is of poor quality, the process control 232 may correlate the confidence score of the transcription with user indication of quality to determine a confidence score that is associated with poor quality transcriptions. Alternatively or additionally, the quality threshold may be determined based on preferences of the second user, a type of the communication session, a topic of the communication session, etc. For example, when the communication session is determined to be with a professional, such as a doctor, accountant, or lawyer, the quality threshold may be higher than a communication session with a friend or family member. Thus, the quality threshold may have a sliding scale based on information about the type of the communication session.

In response to a quality indication that the quality of the first transcript is unacceptable or poor, the process control 232 may determine that the responsibility to generate the transcription of the first audio data is to be transferred to the second speech recognition system 236 from the first speech recognition system 234. In response to a quality indication that the quality of the first transcript is good or acceptable, the process control 232 may not transfer the responsibility of the transcription to the second speech recognition system 236. At operation 256, additional first audio data from the first device 204 during the communication session may be provided to the second device 206. At operation 258, the second device 206 may provide the additional first audio data to the process control 232. At operation 260, in response to the quality indication that the quality of the first transcript is unacceptable or poor, the process control 232 may multiplex the additional first audio data. At operation 262, the process control 232 may provide the multiplexed first audio data to the first speech recognition system 234. At operation 264, the process control 232 may also provide the multiplexed first audio data to the second speech recognition system 236.

At operation 266, the first speech recognition system 234 may provide a first transcript of the multiplexed first audio data to the process control 232. In these and other embodiments, the first speech recognition system 234 may generate the first transcript based on the multiplexed first audio data.

At operation 268, the second speech recognition system 236 may provide a second transcript of the multiplexed first audio data to the process control 232. In these and other embodiments, the second speech recognition system 236 may generate the second transcript based on the multiplexed first audio data. The second speech recognition system 236 may be an automatic system or a re-voicing system.

When the second speech recognition system 236 is a re-voicing system, the second speech recognition system 236 may be configured to broadcast audio based on the multiplexed audio data. For example, the second speech recognition system 236 may be configured broadcast the audio that corresponds to the multiplexed audio data. The second speech recognition system 236 may be further configured to obtain second audio data based on a re-voicing of the broadcast audio. For example, a captioning assistant may listen to the broadcast audio and speak the words that are in the broadcast audio. The second speech recognition system 236 may capture the words spoken by the captioning assistant using a microphone to obtain the second audio data. The second audio data may be provided to a speech recognition engine that is trained with respect to the voice of the captioning assistant. The speech recognition engine may generate the second transcript using the second audio data.

At operation 270, the process control 232 may provide the first transcript from the first speech recognition system 234 based on the multiplexed first audio data to the second device 206. The second device 206 may present the first transcript for the second user of the second device 206.

At operation 272, the process control 232 may obtain a transfer indication. The transfer indication may be based on a comparison of the first transcript and the second transcript. Alternatively or additionally, the transfer indication may be based on the second transcript. Alternatively or additionally, the transfer indication may be based on other factors as discussed in this disclosure. In response to the transfer indication, the process control 232 may determine to cease multiplexing of the first audio data. Further, the process control 232 may determine to cease sending the first audio data to the first speech recognition system 234 and to send the first audio data to the second speech recognition system 236. Alternatively or additionally, the process control 232 may determine to cease sending the first transcript to the second device 206. In these and other embodiments, the process control 232 may determine to send the second transcript to the second device 206 in place of the first transcript.

At operation 274, additional first audio data from the first device 204 during the communication session may be provided to the second device 206. At operation 276, the second device 206 may provide the additional first audio data to the process control 232. At operation 278, in response to the transfer indication, the process control 232 may provide the first audio data to the second speech recognition system 236. At operation 280, the second speech recognition system 236 may provide a second transcript of the first audio data to the process control 232. In these and other embodiments, the second speech recognition system 236 may generate the second transcript based on the first audio data. At operation 282, the process control 232 may provide the first transcript from the second speech recognition system 236, which is based on the first audio data, to the second device 206. The second device 206 may present the first transcript to the second user of the second device 206.

Modifications, additions, or omissions may be made to the operations 200 without departing from the scope of the present disclosure. For example, in some embodiments, the operations 200 may include one or more additional operations. For example, the operations 200 may include additional operations regarding providing second audio data from the second device 206 to the first device 204. As another example, in some embodiments, the operations 200 may be arranged in a different order. For example, the operation 246 may occur before the operation 242

Figure 3:
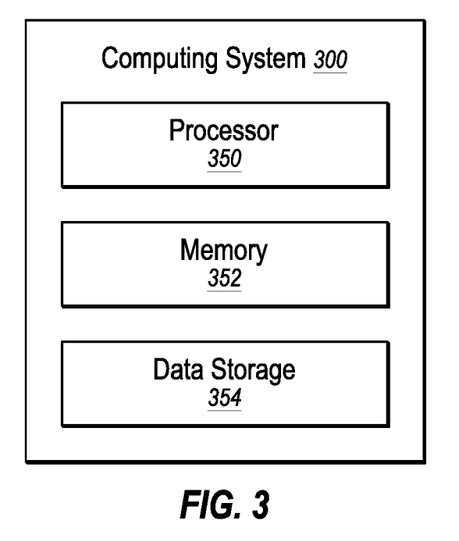
FIG. 3 illustrates an example system that may be used during transcription of communications.

FIG. 3 illustrates a block diagram of an example computing system 300. The computing system 300 may be configured according to at least one embodiment of the present disclosure and may be configured to perform one or more operations related to generating an ASR output. The computing system 300 may include a processor 350, a memory 352, and a data storage 354. The processor 350, the memory 352, and the data storage 354 may be communicatively coupled In general, the processor 350 may include any suitable special-purpose or general-purpose computer, computing entity, or processing device including various computer hardware or software modules and may be configured to execute instructions stored on any applicable computer-readable storage media. For example, the processor 350 may include a microprocessor, a microcontroller, a digital signal processor (DSP), an application-specific integrated circuit (ASIC), a Field-Programmable Gate Array (FPGA), or any other digital or analog circuitry configured to interpret and/or to execute program instructions and/or to process data. Although illustrated as a single processor in FIG. 3, the processor 350 may include any number of processors configured to, individually or collectively, perform or direct performance of any number of operations described in the present disclosure. Additionally, one or more of the processors may be present on one or more different electronic devices, such as different servers.

In some embodiments, the processor 350 may be configured to interpret and/or execute program instructions and/or process data stored in the memory 352, the data storage 354, or the memory 352 and the data storage 354. In some embodiments, the processor 350 may fetch program instructions from the data storage 354 and load the program instructions in the memory 352. After the program instructions are loaded into memory 352, the processor 350 may execute the program instructions.

For example, in some embodiments, the computing system 300 may be part of the process control 132 of FIG. 1. In these and other embodiments, the program instructions when executed by the processor 350 may direct or cause the process control 132 to transfer responsibility of transcription generation from the first speech recognition system 134 to the second speech recognition system 136.

The memory 352 and the data storage 354 may include computer-readable storage media for carrying or having computer-executable instructions or data structures stored thereon. Such computer-readable storage media may include any available media that may be accessed by a general-purpose or special-purpose computer, such as the processor 350. By way of example, and not limitation, such computer-readable storage media may include tangible or non-transitory computer-readable storage media including Random Access Memory (RAM), Read-Only Memory (ROM), Electrically Erasable Programmable Read-Only Memory (EEPROM), Compact Disc Read-Only Memory (CD-ROM) or other optical disk storage, magnetic disk storage or other magnetic storage devices, flash memory devices (e.g., solid state memory devices), or any other storage medium which may be used to carry or store particular program code in the form of computer-executable instructions or data structures and which may be accessed by a general-purpose or special-purpose computer. In these and other embodiments, the term "non-transitory" as explained in the present disclosure should be construed to exclude only those types of transitory media that were found to fall outside the scope of patentable subject matter in the Federal Circuit decision of *In re Nuijten,* 500 F.3d 1346 (Fed. Cir. 2007). Combinations of the above may also be included within the scope of computer-readable media.

Modifications, additions, or omissions may be made to the computing system 300 without departing from the scope of the present disclosure. For example, in some embodiments, the computing system 300 may include any number of other components that may not be explicitly illustrated or described.

Figure 4:
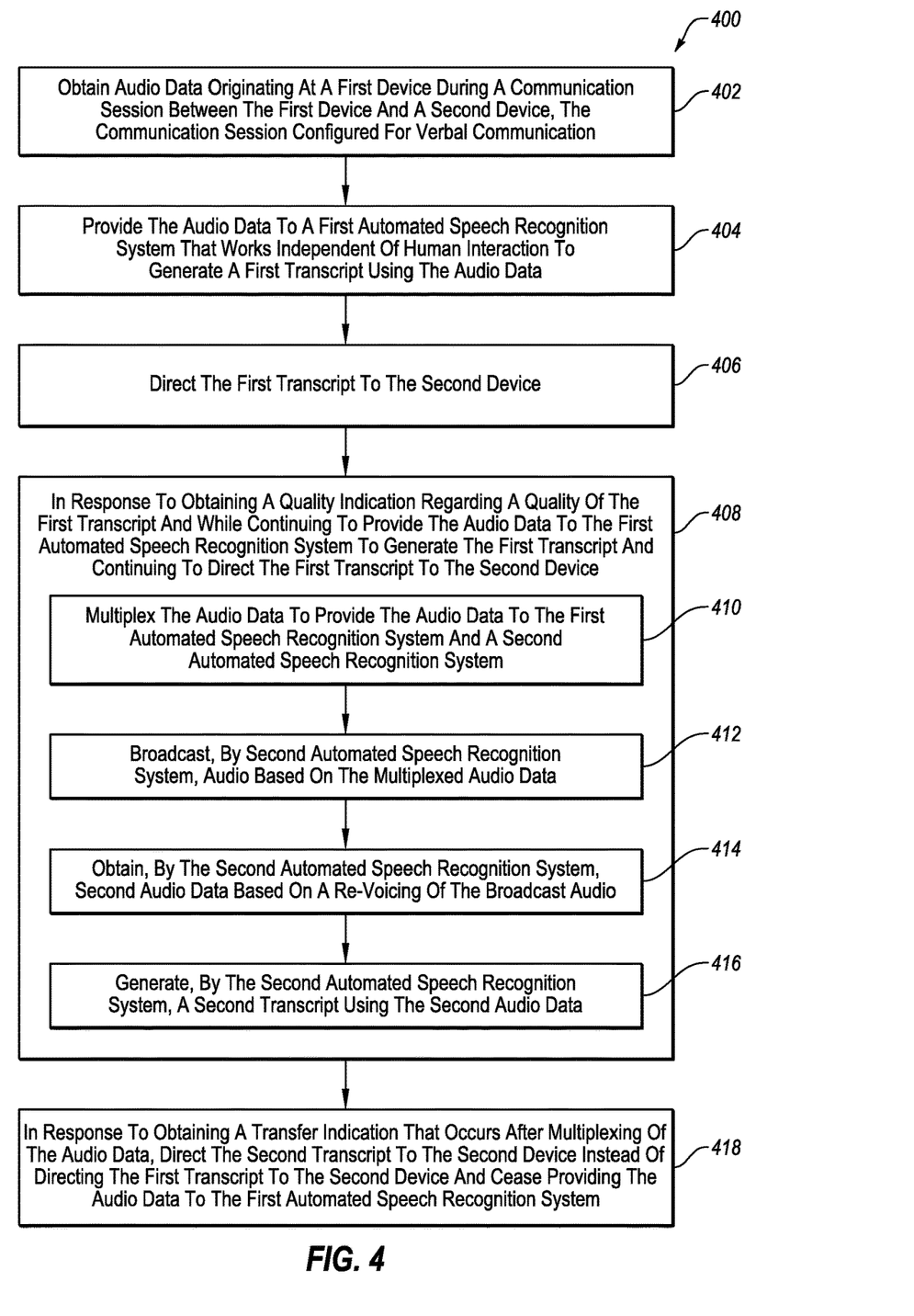
FIG. 4 is a flowchart of an example method to transcribe communications.

FIG. 4 is a flowchart of an example method 400 to transcribe communications. The method 400 may be arranged in accordance with at least one embodiment described in the present disclosure. The method 400 may be performed, in some embodiments, by a device or system, such as the transcription system 130 of FIG. 1 or the computing system 300 of FIG. 3, or another device. In these and other embodiments, the method 400 may be performed based on the execution of instructions stored on one or more non-transitory computer-readable media. Although illustrated as discrete blocks, various blocks may be divided into additional blocks, combined into fewer blocks, or eliminated, depending on the desired implementation.

The method 400 may begin at block 402, where audio data originating at a first device during a communication session between the first device and a second device may be obtained. In these and other embodiments, the communication session may be configured for verbal communication.

At block 404, the audio data may be provided to a first automated speech recognition system that works independent of human interaction to generate a first transcript using the audio data. At block 406, the first transcript may be directed to the second device.

At block 408, in response to obtaining a quality indication regarding a quality of the first transcript and while continuing to provide the audio data to the first automated speech recognition system to generate the first transcript and continuing to direct the first transcript to the second device, the method 400 may perform blocks 410, 412, 414, and 416. In some embodiments, the quality indication may be obtained from the second device.

At block 410, the audio data may be multiplexed to provide the audio data to the first automated speech recognition system and a second automated speech recognition system. At block 412, audio, based on the multiplexed audio data, may be broadcasted by second automated speech recognition system.

At block 414, second audio data, based on a re-voicing of the broadcast audio, may be obtained by the second automated speech recognition system. At block 416, a second transcript using the second audio data may be generated by the second automated speech recognition system.

At block 418, in response to a transfer indication that occurs after multiplexing of the audio data, the second transcript may be directed to the second device instead of directing the first transcript to the second device. Alternatively or additionally, in response to obtaining a transfer indication that occurs after multiplexing of the audio data, providing the audio data to the first automated speech recognition system may be ceased.

In some embodiments, the transfer indication may include after multiplexing of the audio data, for a time period the audio data does not include spoken words that result in text in the first transcript. Alternatively or additionally, the transfer indication may include the second transcript including text, after multiplexing of the audio data, the first transcript includes first text and then for a second time period the audio data does not include spoken words that result in text in the first transcript, or a first last phrase of the first transcript is the same as a second last phrase of the second transcript.

It is understood that, for this and other processes, operations, and methods disclosed herein, the functions and/or operations performed may be implemented in differing order. Furthermore, the outlined functions and operations are only provided as examples, and some of the functions and operations may be optional, combined into fewer functions and operations, or expanded into additional functions and operations without detracting from the essence of the disclosed embodiments.

For example, in some embodiments, the method 400 may further include obtaining a confidence score of the first transcript from the first automated speech recognition system and obtaining the quality indication based on a comparison of the confidence score to a quality threshold.

Figure 5:
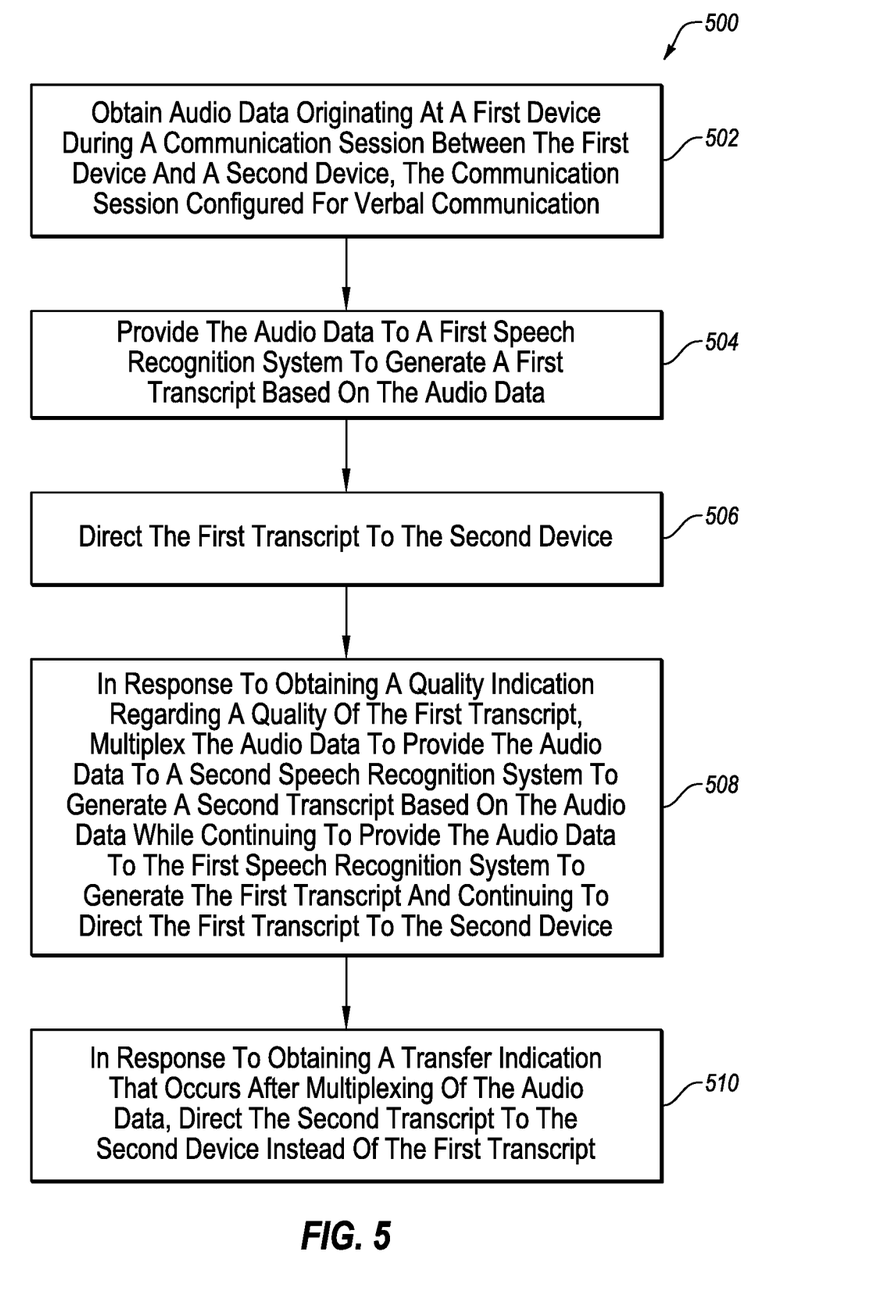
FIG. 5 is a flowchart of another example method to transcribe communications.

FIG. 5 is a flowchart of another example method 500 to transcribe communications. The method 500 may be arranged in accordance with at least one embodiment described in the present disclosure. The method 500 may be performed, in some embodiments, by a device or system, such as the transcription system 130 of FIG. 1 or the computing system 300 of FIG. 3, or another device. In these and other embodiments, the method 500 may be performed based on the execution of instructions stored on one or more non-transitory computer-readable media. Although illustrated as discrete blocks, various blocks may be divided into additional blocks, combined into fewer blocks, or eliminated, depending on the desired implementation.

The method 500 may begin at block 502, where audio data originating at a first device during a communication session between the first device and a second device may be obtained. In some embodiments, the communication session may be configured for verbal communication At block 504, the audio data may be provided to a first speech recognition system to generate a first transcript based on the audio data. At block 506, the first transcript may be directed to the second device.

At block 508, in response to obtaining a quality indication regarding a quality of the first transcript, the audio data may be multiplexed to provide the audio data to a second speech recognition system to generate a second transcript based on the audio data while continuing to provide the audio data to the first speech recognition system to generate the first transcript and continuing to direct the first transcript to the second device.

In some embodiments, the quality indication may be obtained from the second device. In some embodiments, the first speech recognition system and the second speech recognition system may be automated speech recognition systems that works independent of human interaction. Alternatively or additionally, the first speech recognition system may be an automated speech recognition system that works independent of human interaction and the generation of the second transcript by the second speech recognition system may include broadcasting audio based on the audio data and obtaining second audio data based on a re-voicing of the broadcast audio. In these and other embodiments, the second transcript may be generated based on the second audio data.

At block 510, in response to a transfer indication that occurs after multiplexing of the audio data, the second transcript may be directed to the second device instead of the first transcript.

In some embodiments, the transfer indication may include after multiplexing of the audio data, for a time period the audio data does not include spoken words that result in text in the first transcript. Alternatively or additionally, the transfer indication may include the second transcript including text, after multiplexing of the audio data, the first transcript includes first text and then for a second time period the audio data does not include spoken words that result in text in the first transcript, or a first last phrase of the first transcript is the same as a second last phrase of the second transcript.

It is understood that, for this and other processes, operations, and methods disclosed herein, the functions and/or operations performed may be implemented in differing order. Furthermore, the outlined functions and operations are only provided as examples, and some of the functions and operations may be optional, combined into fewer functions and operations, or expanded into additional functions and operations without detracting from the essence of the disclosed embodiments.

For example, in some embodiments, the method 500 may further include in response to obtaining a transfer indication that occurs after multiplexing of the audio data, ceasing providing the audio data to the first speech recognition system.

Alternatively or additionally, the method 500 may further include obtaining a confidence score of the first transcript from the first automated speech recognition system and obtaining the quality indication based on a comparison of the confidence score to a quality threshold.

In some embodiments, a method to transcribe communications may include obtaining audio data originating at a first device during a communication session between the first device and a second device. The communication session may be configured for verbal communication. The method may further include providing the audio data to a first automated speech recognition system that works independent of human interaction to generate a first transcript using the audio data and directing the first transcript to the second device. The method may also include in response to obtaining a quality indication regarding a quality of the first transcript and while continuing to provide the audio data to the first automated speech recognition system to generate the first transcript and continuing to direct the first transcript to the second device, the method including: multiplexing the audio data to provide the audio data to the first automated speech recognition system and a second automated speech recognition system; broadcasting, by second automated speech recognition system, audio based on the multiplexed audio data; obtaining, by the second automated speech recognition system, second audio data based on a re-voicing of the broadcast audio; and generating, by the second automated speech recognition system, a second transcript using the second audio data. The method may further include in response to a transfer indication that occurs after multiplexing of the audio data, directing the second transcript to the second device instead of directing the first transcript to the second device and ceasing providing the audio data to the first automated speech recognition system. In some embodiments, the quality indication regarding a quality of the first transcript may include the quality indication indicating a quality of the first transcript is below a quality threshold. In some embodiments, the quality indication may be obtained from the second device.

In some embodiments, the method may further include obtaining a confidence score of the first transcript from the first automated speech recognition system and obtaining the quality indication based on a comparison of the confidence score to a quality threshold.

In some embodiments, the transfer indication may include an occurrence of one of the following: after multiplexing of the audio data, for a time period the audio data does not include spoken words that result in text in the first transcript, the second transcript including text, after multiplexing of the audio data, the first transcript includes first text and then for a second time period the audio data does not include spoken words that result in text in the first transcript, and a first last phrase of the first transcript is the same as a second last phrase of the second transcript.

As indicated above, the embodiments described herein may include the use of a special purpose or general purpose computer (e.g., the processor 350 of FIG. 3) including various computer hardware or software modules, as discussed in greater detail below. Further, as indicated above, embodiments described herein may be implemented using computer-readable media (e.g., the memory 352 of FIG. 3) for carrying or having computer-executable instructions or data structures stored thereon.

In some embodiments, the different components, modules, engines, and services described herein may be implemented as objects or processes that execute on a computing system (e.g., as separate threads). While some of the systems and methods described herein are generally described as being implemented in software (stored on and/or executed by general purpose hardware), specific hardware implementations or a combination of software and specific hardware implementations are also possible and contemplated.

In accordance with common practice, the various features illustrated in the drawings may not be drawn to scale. The illustrations presented in the present disclosure are not meant to be actual views of any particular apparatus (e.g., device, system, etc.) or method, but are merely idealized representations that are employed to describe various embodiments of the disclosure. Accordingly, the dimensions of the various features may be arbitrarily expanded or reduced for clarity. In addition, some of the drawings may be simplified for clarity. Thus, the drawings may not depict all of the components of a given apparatus (e.g., device) or all operations of a particular method.

Terms used herein and especially in the appended claims (e.g., bodies of the appended claims) are generally intended as "open" terms (e.g., the term "including" should be interpreted as "including, but not limited to," the term "having" should be interpreted as "having at least," the term "includes" should be interpreted as "includes, but is not limited to," etc.).

Additionally, if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations.

In addition, even if a specific number of an introduced claim recitation is explicitly recited, it is understood that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." or "one or more of A, B, and C, etc." is used, in general such a construction is intended to include A alone, B alone, C alone, A and B together, A and C together, B and C together, or A, B, and C together, etc. For example, the use of the term "and/or" is intended to be construed in this manner. Further, any disjunctive word or phrase presenting two or more alternative terms, whether in the description, claims, or drawings, should be understood to contemplate the possibilities of including one of the terms, either of the terms, or both terms. For example, the phrase "A or B" should be understood to include the possibilities of "A" or "B" or "A and B."

Additionally, the use of the terms "first," "second," "third," etc., are not necessarily used herein to connote a specific order or number of elements. Generally, the terms "first," "second," "third," etc., are used to distinguish between different elements as generic identifiers. Absence a showing that the terms "first," "second," "third," etc., connote a specific order, these terms should not be understood to connote a specific order. Furthermore, absence a showing that the terms first," "second," "third," etc., connote a specific number of elements, these terms should not be understood to connote a specific number of elements. For example, a first widget may be described as having a first side and a second widget may be described as having a second side. The use of the term "second side" with respect to the second widget may be to distinguish such side of the second widget from the "first side" of the first widget and not to connote that the second widget has two sides.

All examples and conditional language recited herein are intended for pedagogical objects to aid the reader in understanding the invention and the concepts contributed by the inventor to furthering the art, and are to be construed as being without limitation to such specifically recited examples and conditions. Although embodiments of the present disclosure have been described in detail, it should be understood that the various changes, substitutions, and alterations could be made hereto without departing from the spirit and scope of the present disclosure.

The invention claimed is:

1. A method to transcribe communications, the method comprising:
   obtaining, at a transcription system, audio data;
   directing, from the transcription system, a first transcript of the audio data from a first speech recognition system of the transcription system to a device remote from the transcription system;
   obtaining, at the transcription system, a quality indication of the first transcript;
   in response to obtaining the quality indication, providing, by the transcription system, the audio data to a second speech recognition system of the transcription system to generate a second transcript of the audio data while continuing to provide the audio data to the first speech recognition system to generate the first transcript and continuing to direct the first transcript from the transcription system to the device; and
   in response to obtaining the second transcript at the transcription system and in response to an occurrence of an event that is used to indicate the second transcript is to be directed to the device, directing, from the transcription system, the second transcript to the device instead of the first transcript, wherein the event includes one of the following: the audio data not including spoken words for a first time period, the first transcript including first text and then for a second time period the audio data not including spoken words, and a last phrase of the first transcript is the same as a last phrase of the second transcript.

2. The method of claim 1, wherein the first speech recognition system and the second speech recognition system are automated speech recognition systems that work independent of human interaction.

3. The method of claim 1, wherein the first speech recognition system is an automated speech recognition system that works independent of human interaction and the generation of the second transcript by the second speech recognition system includes:
   broadcasting audio based on the audio data; and
   obtaining second audio data based on a re-voicing of the broadcast audio, wherein the second transcript is generated based on the second audio data.

4. The method of claim 1, further comprising:
   obtaining a confidence score of the first transcript from the first speech recognition system; and
   obtaining the quality indication based on a comparison of the confidence score to a quality threshold.

5. The method of claim 1, wherein the quality indication is obtained from the device.

6. The method of claim 1, further comprising in response to the occurrence of the event, ceasing providing the audio data to the first speech recognition system.

7. At least one non-transitory computer-readable media configured to store one or more instructions that when executed by at least one processor cause or direct a system to perform the method of claim 1.

8. A transcription system comprising:
   at least one processor; and
   at least one non-transitory computer-readable media communicatively coupled to the at least one processor and configured to store one or more instructions that when executed by the at least one processor cause or direct the system to perform operations comprising:

obtain, at the transcription system, audio data;

direct, from the transcription system, a first transcript of the audio data from a first speech recognition system of the transcription system to a device remote from the transcription system;

obtain, at the transcription system, a quality indication of the first transcript;

in response to obtaining the quality indication, provide, by the transcription system, the audio data to a second speech recognition system of the transcription system to generate a second transcript of the audio data while continuing to provide the audio data to the first speech recognition system to generate the first transcript and continuing to direct the first transcript from the transcription system to the device; and in response to obtaining the second transcript at the transcription system and in response to an occurrence of an event that is used to indicate the second transcript is to be directed to the device, direct, from the transcription system, the second transcript to the device instead of the first transcript, wherein the event includes one of the following: the audio data not including spoken words for a first time period, the first transcript including first text and then for a second time period the audio data not including spoken words, and a last phrase of the first transcript is the same as a last phrase of the second transcript.

9. The system of claim 8, wherein the first speech recognition system and the second speech recognition system are automated speech recognition systems that work independent of human interaction.

10. The system of claim 8, wherein the first speech recognition system is an automated speech recognition system that works independent of human interaction and the generation of the second transcript by the second speech recognition system includes operations comprising:

broadcast audio based on the audio data; and obtain second audio data based on a re-voicing of the broadcast audio, wherein the second transcript is generated based on the second audio data.

11. The system of claim 8, wherein the operations further comprise:

obtain a confidence score of the first transcript from the first speech recognition system; and obtain the quality indication based on a comparison of the confidence score to a quality threshold.

12. The system of claim 8, wherein the quality indication is obtained from the device.

13. The system of claim 8, wherein the operations further comprise in response to the occurrence of the event, cease providing the audio data to the first speech recognition system.

14. A method comprising:

obtaining, at a device from a remote transcription system over a network, a first transcript of audio data from a first speech recognition system of the transcription system; and obtaining, at the device, a second transcript of the audio data from a second speech recognition system of the transcription system instead of the first transcript in response to the second transcript being generated and in response to an occurrence of an event that is used to indicate the second transcript is to be directed to the device from the transcription system, wherein the second transcript is generated in response to a quality indication of the first transcript being below a threshold and while the first speech recognition system continues to generate the first transcript and device continues to obtain the first transcript, and wherein the event includes one of the following: the audio data not including spoken words for a first time period, the first transcript including first text and then for a second time period the audio data not including spoken words, and a last phrase of the first transcript is the same as a last phrase of the second transcript.

15. The method of claim 14, further comprising directing the quality indication from the device to another system that directs the generation of the second transcript.

16. The method of claim 14, further comprising presenting the first transcript before obtaining the second transcript.

17. The method of claim 14, wherein the first transcript and the second transcript are aligned such that all words represented in the audio data are in one of either the first transcript or the second transcript.

18. The method of claim 14, wherein the first transcript and the second transcript are aligned such that words from the first transcript and words from the second transcript are not duplicated.

* * * * *